United States Patent
Choumwong et al.

(10) Patent No.: US 8,545,164 B2
(45) Date of Patent: Oct. 1, 2013

(54) SYSTEMS AND METHODS FOR REPOSITIONING ROW BARS USED FOR MANUFACTURING MAGNETIC HEADS

(75) Inventors: Sarapong Choumwong, Bangkok (TH); Sunan Maliwong, Pathumthani (TH); Somporn Pitakkotchawong, Nakornsritammarat (TH)

(73) Assignee: Western Digital (Fremont), LLC, Fremont, CA (US)

( * ) Notice: Subject to any disclaimer, the term of this patent is extended or adjusted under 35 U.S.C. 154(b) by 318 days.

(21) Appl. No.: 12/961,411

(22) Filed: Dec. 6, 2010

(65) Prior Publication Data
US 2012/0141243 A1 Jun. 7, 2012

(51) Int. Cl.
*B08B 9/08* (2006.01)
*B65G 47/22* (2006.01)

(52) U.S. Cl.
USPC ........... 414/760; 414/754; 414/758; 414/761; 193/48; 193/44; 193/45; 193/46

(58) Field of Classification Search
USPC ................. 414/758, 760, 776, 779, 780, 764, 414/765, 767, 768, 769, 772, 754, 761; 193/44–46, 48
IPC ..................................................... B65G 47/244
See application file for complete search history.

(56) References Cited

U.S. PATENT DOCUMENTS

| | | | |
|---|---|---|---|
| 4,106,647 A * | 8/1978 | Robert | 414/816 |
| 5,117,589 A | 6/1992 | Bischoff et al. | |
| 5,161,457 A * | 11/1992 | Evans | 99/360 |
| 5,474,168 A * | 12/1995 | Leslie et al. | 198/484.1 |
| 5,702,224 A * | 12/1997 | Kubota | 414/403 |
| 5,745,983 A | 5/1998 | Quintana et al. | |
| 6,077,031 A * | 6/2000 | Lust et al. | 414/806 |
| 6,287,475 B1 | 9/2001 | Fukushima et al. | |
| 6,551,438 B1 | 4/2003 | Tanemura | |
| 6,666,323 B2 * | 12/2003 | Benmayor Vivas et al. | 198/409 |
| 7,290,978 B2 * | 11/2007 | Tran | 414/763 |
| 7,464,456 B2 | 12/2008 | Fujii et al. | |
| 8,299,784 B2 * | 10/2012 | Tokutomi et al. | 324/210 |
| 2006/0228996 A1 | 10/2006 | Biskeborn | |
| 2008/0024922 A1 | 1/2008 | Satoyoshi et al. | |
| 2008/0137075 A1 | 6/2008 | Fujii et al. | |
| 2008/0231983 A1 | 9/2008 | Tokutomi et al. | |
| 2009/0277591 A1 | 11/2009 | Zhao et al. | |

* cited by examiner

*Primary Examiner* — Gregory Adams
*Assistant Examiner* — Lynn Schwenning (57) ABSTRACT

A system for repositioning row bars includes a base support including a top surface, and a support arm positioned on the top surface and configured to rotate from a first position to a second position, a tray assembly coupled to the support arm, the tray assembly including a first tray including a plurality of first channels, each configured to retain one of the row bars in an initial position, a transfer substrate including a plurality of transfer channels, each configured to receive one of the row bars from the first tray as the support arm moves from the first position to the second position, and a second tray including a plurality of second channels, each configured to retain the one of the row bars in a final position, where the row bars in the final position are rotated by a preselected number of degrees from the initial position.

28 Claims, 7 Drawing Sheets

SYSTEMS AND METHODS FOR REPOSITIONING ROW BARS USED FOR MANUFACTURING MAGNETIC HEADS

FIELD

The present invention relates to magnetic recording technology, and more specifically to systems and methods for repositioning or changing an orientation of row bars used for manufacturing magnetic heads.

BACKGROUND

Information storage devices such as disk drive devices use magnetic media to store data and a movable slider having a read/write head positioned over the magnetic media to selectively read data from and write data to the magnetic media. The sliders can be formed by processing a wafer which is generally used to manufacture sliders using a series of procedures. At first, the wafer can be subjected to a lapping process, a cleaning process, a depositing process and an etching process. Then, the processed wafer can be sliced into a number of row bars by a suitable cutting tool such as a diamond cutting wheel, where each row bar will ultimately be sectioned into a number of sliders. Next, each row bar is subjected to a series of subsequent procedures, such as lapping, photolithography, bonding and testing. Then, each row bar is cut into a number of individual sliders using a cutter, such as the aforementioned diamond-cutting wheel.

Many of the process steps described above require loading and transferring of the row bars, which can be time consuming and inefficient as these steps are often performed by operators using tweezers. For example, manual transfer of the row bars from one tray to another where the row bar direction changes 90 degrees is time consuming and risks handling defects, cross contamination, and disordering of row bar locations in the tray slots. This 90 degree transfer is typically performed at manufacturing stages such as bar dividing, side lapping, diamond like carbon (DLC) coating, tip de-bonding, and slider parting. Various approaches to repositioning the row bars during the slider manufacturing process have been proposed. However, the conventional approaches often require complex bonding steps and can be fairly time consuming. As a result, an improved system and method for repositioning the row bars during the slider manufacturing process is needed.

SUMMARY

Aspects of the invention relate to systems and methods for repositioning or changing an orientation of row bars used for manufacturing magnetic heads. In one embodiment, the invention relates to a system for changing an orientation of a plurality of row bars used for manufacturing magnetic heads, the system including a base support including a top surface, and at least one support arm positioned on the top surface and configured to rotate relative to the top surface from a first position to a second position, a tray assembly coupled to the at least one support arm, the tray assembly including a first tray including a plurality of first channels, each configured to retain one of the row bars in an initial position, a transfer substrate including a plurality of transfer channels, each configured to receive one of the row bars from the first tray as the support arm moves from the first position to the second position, and a second tray including a plurality of second channels, each configured to receive one of the row bars from the transfer substrate and to retain the one of the row bars in a final position, where the first tray and second tray are configured to sandwich the transfer substrate, where the row bars in the final position are rotated by a preselected number of degrees from the initial position.

In another embodiment, the invention relates to a method for changing an orientation of a plurality of row bars used in manufacturing magnetic heads, the method including positioning each of the plurality of row bars within one of a plurality of channels of a first tray, where each of the plurality of channels is configured to retain one of the row bars in an initial position, positioning a transfer substrate, including a plurality of transfer channels, on the first tray such that the first channels and the transfer channels are aligned, where each transfer channel of the transfer substrate is configured to receive one of the row bars from the first tray, positioning a second tray, including a plurality of second channels, on the transfer substrate such that the transfer channels and the second channels are aligned, where each of the second channels is configured to receive one of the row bars from the transfer substrate and to retain the one of the row bars in a final position, coupling the first tray, the transfer substrate and second tray to at least one support arm to form an assembly, the at least one support arm positioned on a top surface of a base support and configured to rotate relative to the top surface from a first position a second position, and moving the assembly from the first position to the second position, thereby moving the plurality of row bars from the initial position to the final position, where the row bars in the final position are rotated by a preselected number of degrees from the initial position.

DETAILED DESCRIPTION

Referring now to the drawings, embodiments of systems and methods for repositioning or changing an orientation of row bars used for manufacturing magnetic heads are illustrated. In several embodiments, the systems include a row bar repositioning assembly having a base support and a tray assembly attached to one or more support arms configured to rotate about an axis parallel to the top surface of the base support. The tray assembly can include a vertical tray, a transfer tray, and a horizontal tray. The vertical tray or first tray is used to retain row bars in a vertical position with respect to the top surface of the base support. The transfer tray or transfer substrate receives the row bars from the vertical tray and repositions them as the tray assembly is rotated. The horizontal tray or second tray receives the row bars from the transfer tray and retains them in a horizontal position as the tray assembly is further rotated to a final position. In the final position, the row bars have been rotated about 90 degrees from an initial vertical orientation to a final horizontal orientation. The tray assembly could be rotated in an opposite direction such that the row bars are horizontal in an initial position and vertical in the final position. In several embodiments, the row bars are rotated by about 90 degrees. In other embodiments, the row bars are rotated by another preselected number of degrees.

Figure 1A:
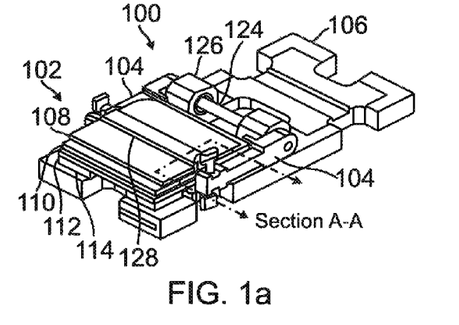
FIG. 1a is a perspective view of a row bar repositioning assembly including a tray assembly, in a first position, coupled to rotating support arms attached to a base support in accordance with one embodiment of the invention.

FIG. 1a is a perspective view of a row bar repositioning assembly 100 including a tray assembly 102, in a first position, coupled to rotating support arms 104 attached to a base support 106 in accordance with one embodiment of the invention. The tray assembly 102 includes a horizontal tray 108 positioned on top of a transfer tray 110. The transfer tray is positioned on top of a vertical tray 112. The vertical tray is positioned on top of a base pusher tray 114.

Figure 1B:
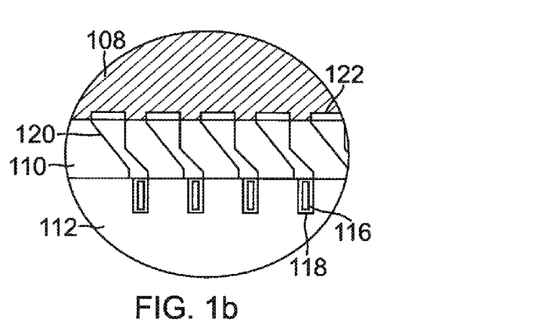
FIG. 1b is a cross sectional view of a portion of the tray assembly of FIG. 1a taken across section A-A illustrating a plurality of row bars in a vertical position in accordance with one embodiment of the invention.

FIG. 1b is a cross sectional view of a portion of the tray assembly 102 of FIG. 1a taken across section A-A illustrating a plurality of row bars 116 in a vertical position in accordance with one embodiment of the invention. The vertical tray 112 includes a number of vertical channels 118 for retaining the row bars 116 in the vertical position while the tray assembly 102 is in the first position along the base support 106. In the first position, the transfer tray 110 is on top of the vertical tray 112. The transfer tray 110 includes a number of transfer channels 120 aligned with the vertical channels 118 to receive the row bars 116 when the tray assembly 102 is rotated. The transfer channels 120 each include a small opening at one end and a large opening at the other end where the large opening is offset in a lateral direction from the small opening to facilitate rotation of the row bars along a longitudinal axis as the tray assembly is rotated.

In the first position of the tray assembly 102 as illustrated in FIG. 1a, the horizontal tray 108 is on top of the transfer tray 110. The horizontal tray 108 includes a number of horizontal channels 122 aligned with the transfer channels 120 to receive the row bars 116 from the transfer tray 110 when the tray assembly 102 is rotated. The horizontal tray 108 and horizontal channels 122 are configured to retain the row bars in a horizontal position when the tray assembly 102 is fully rotated to a second position (see FIG. 3a).

Returning now to FIG. 1a, the rotating support arms 104 are attached to a cylindrical shaft 124 guided and retained by two shaft retainers 126. The two shaft retainers 126 are spaced apart and attached to the top surface of the base support 106. Each of the shaft retainers 126 includes a circular opening for receiving a portion of the cylindrical shaft 124. In some embodiments, only one shaft retainer is used. In one embodiment, other coupling and rotation assemblies, as are known in the art, can be used that allow the tray assembly 102 to be rotated in a semicircular path over the top surface of the base support 106. The tray assembly 102 is attached to the support arms 104 using an upper clamp 128 and a lower clamp 130 (see FIG. 2a) and various attachment components known in the art.

Figure 2A:
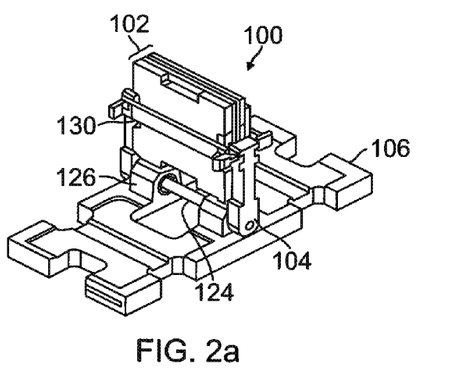
FIG. 2a is a perspective view of the row bar repositioning assembly of FIG. 1a with the tray assembly in an intermediate position in accordance with one embodiment of the invention.

FIG. 2a is a perspective view of the row bar repositioning assembly 100 of FIG. 1a with the tray assembly 102 in an intermediate position in accordance with one embodiment of the invention. In the intermediate position, which is about 90 degrees clockwise from the first position of the tray assembly, the row bars 116 may begin to move from the vertical tray 112 to the transfer tray 110.

Figure 2B:
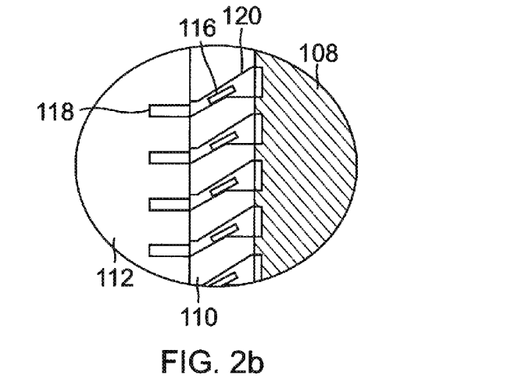
FIG. 2b is a cross sectional view of the same portion of the tray assembly as shown in FIG. 1b, while the tray assembly is in the intermediate position as shown in FIG. 2a, illustrating the row bars in an intermediate position in accordance with one embodiment of the invention.

FIG. 2b is a cross sectional view of the same portion of the tray assembly 102 as shown in FIG. 1b, while the tray assembly 102 is in the intermediate position as shown in FIG. 2a, illustrating the row bars 116 in an intermediate position in accordance with one embodiment of the invention. While FIGS. 2a and 2b show the tray assembly 102 in the intermediate position, during operation of the row bar repositioning assembly, the tray assembly will generally not be stopped at the intermediate position.

Figure 3A:
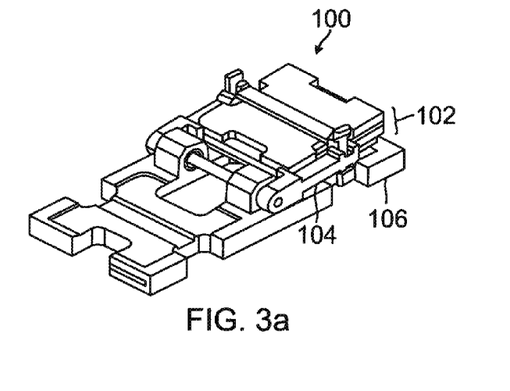
FIG. 3a is a perspective view of the row bar repositioning assembly of FIG. 1a with the tray assembly in a second position in accordance with one embodiment of the invention.

FIG. 3a is a perspective view of the row bar repositioning assembly 100 of FIG. 1a with the tray assembly 102 in a second position in accordance with one embodiment of the invention. In the second position, which is about 180 degrees clockwise from the first position of the tray assembly, gravity and/or rotational force applied to the tray assembly has moved the row bars 116 from the vertical tray 112 through the transfer tray 110 to the horizontal tray 108.

Figure 3B:
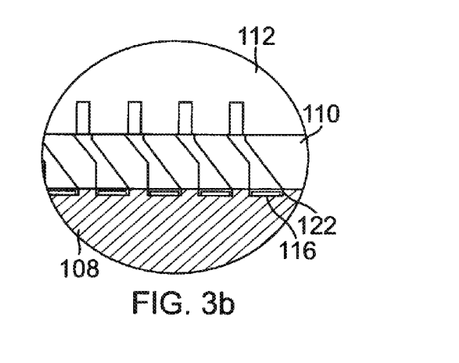
FIG. 3b is the cross sectional view of the same portion of the tray assembly as shown in FIG. 1b, while the tray assembly is in the second position as shown in FIG. 3a, illustrating the row bars in a horizontal position in accordance with one embodiment of the invention.

FIG. 3b is the cross sectional view of the same portion of the tray assembly 102 as shown in FIG. 1b, while the tray assembly 102 is in the second position as shown in FIG. 3a, illustrating the row bars 116 in a horizontal position in accordance with one embodiment of the invention.

Figure 4:
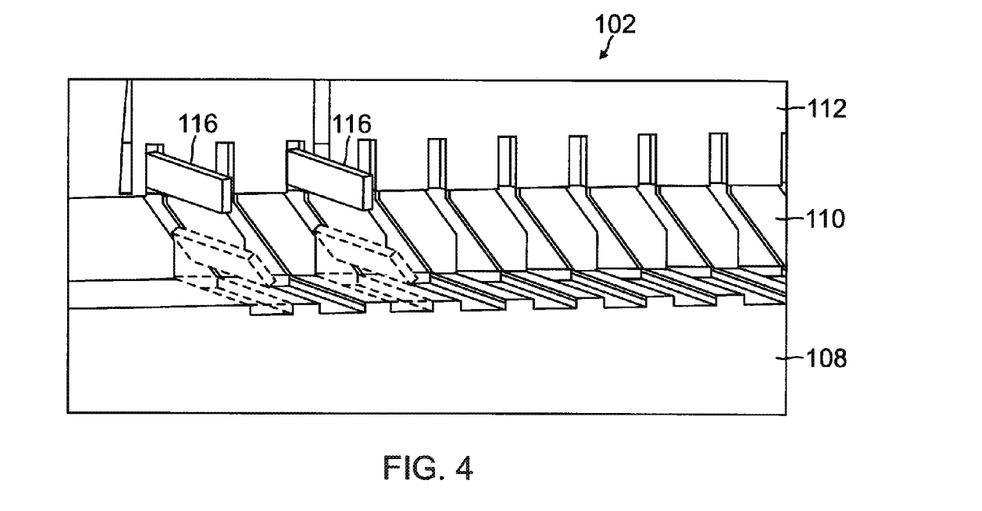
FIG. 4 is a perspective cut away view of a portion of the tray assembly of FIGS. 1a-3a illustrating row bars in an initial vertical position, an intermediate position, and a final horizontal position in accordance with one embodiment of the invention.

FIG. 4 is a perspective cut away view of a portion of the tray assembly 102 of FIGS. 1a-3a illustrating row bars 116 in the initial vertical position, an intermediate position, and the final horizontal position in accordance with one embodiment of the invention.

Figure 5:
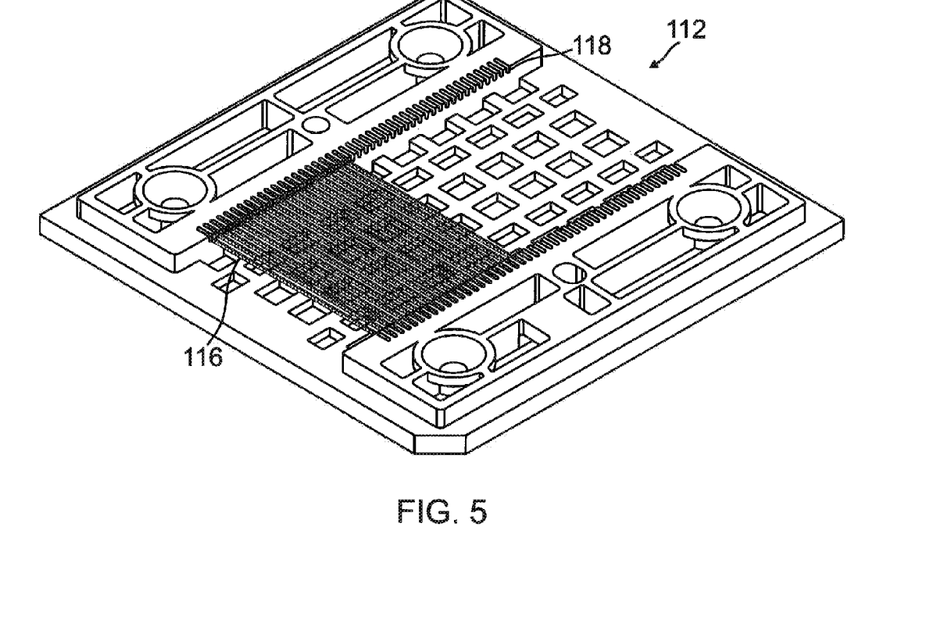
FIG. 5 is a perspective view of a vertical tray of the tray assembly of FIGS. 1a-3a including a number of channels for retaining the row bars in the initial vertical position in accordance with one embodiment of the invention.

FIG. 5 is a perspective view of the vertical tray 112 of the tray assembly 102 of FIGS. 1a-3a including the vertical channels 118 for retaining the row bars 116 in the initial vertical position in accordance with one embodiment of the invention.

Figure 6:
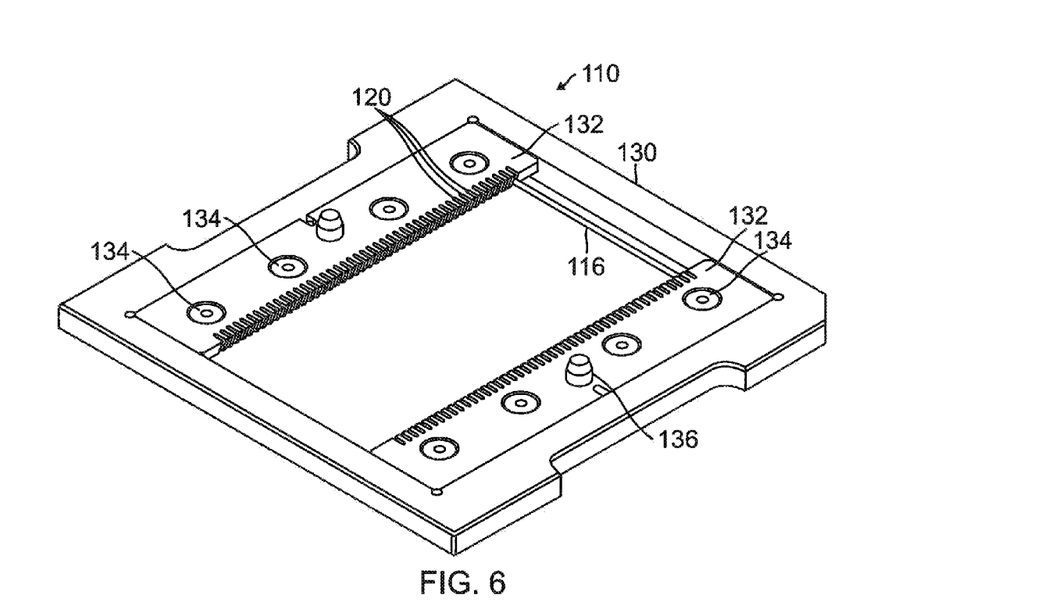
FIG. 6 is a perspective view of a transfer tray of the tray assembly of FIGS. 1a-3a including a number of transfer channels for changing the orientation of the row bars as the tray assembly is rotated in accordance with one embodiment of the invention.

FIG. 6 is a perspective view of the transfer tray 110 of the tray assembly 102 of FIGS. 1a-3a including the transfer channels 120 for changing the orientation of the row bars 116 as the tray assembly 102 is rotated in accordance with one embodiment of the invention. The transfer tray 110 includes a frame 130 and two opposing transfer substrate inserts 132 fastened to the frame 130 using multiple screws 134. The frame 130 and transfer substrate inserts 132 include mounting holes for alignment or guide pins 136. The alignment pins 136 can extend into holes in the vertical tray and the horizontal tray to ensure proper alignment of the channels for each tray assembly component.

Figure 7:
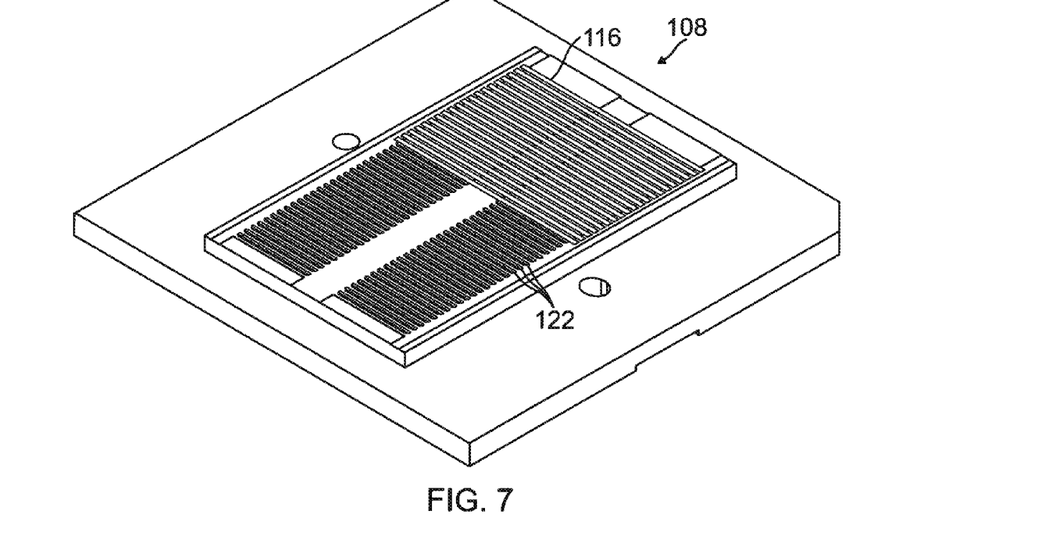
FIG. 7 is a perspective view of a horizontal tray of the tray assembly of FIGS. 1a-3a including a number of channels for receiving and retaining the row bars in the final horizontal position in accordance with one embodiment of the invention.

FIG. 7 is a perspective view of the horizontal tray 108 of the tray assembly 102 of FIGS. 1a-3a including the horizontal channels 122 for receiving and retaining the row bars 116 in the final horizontal position in accordance with one embodiment of the invention. The horizontal tray 108 in FIG. 7 is depicted with a number of row bars 116 resting in the horizontal position.

Figure 8:
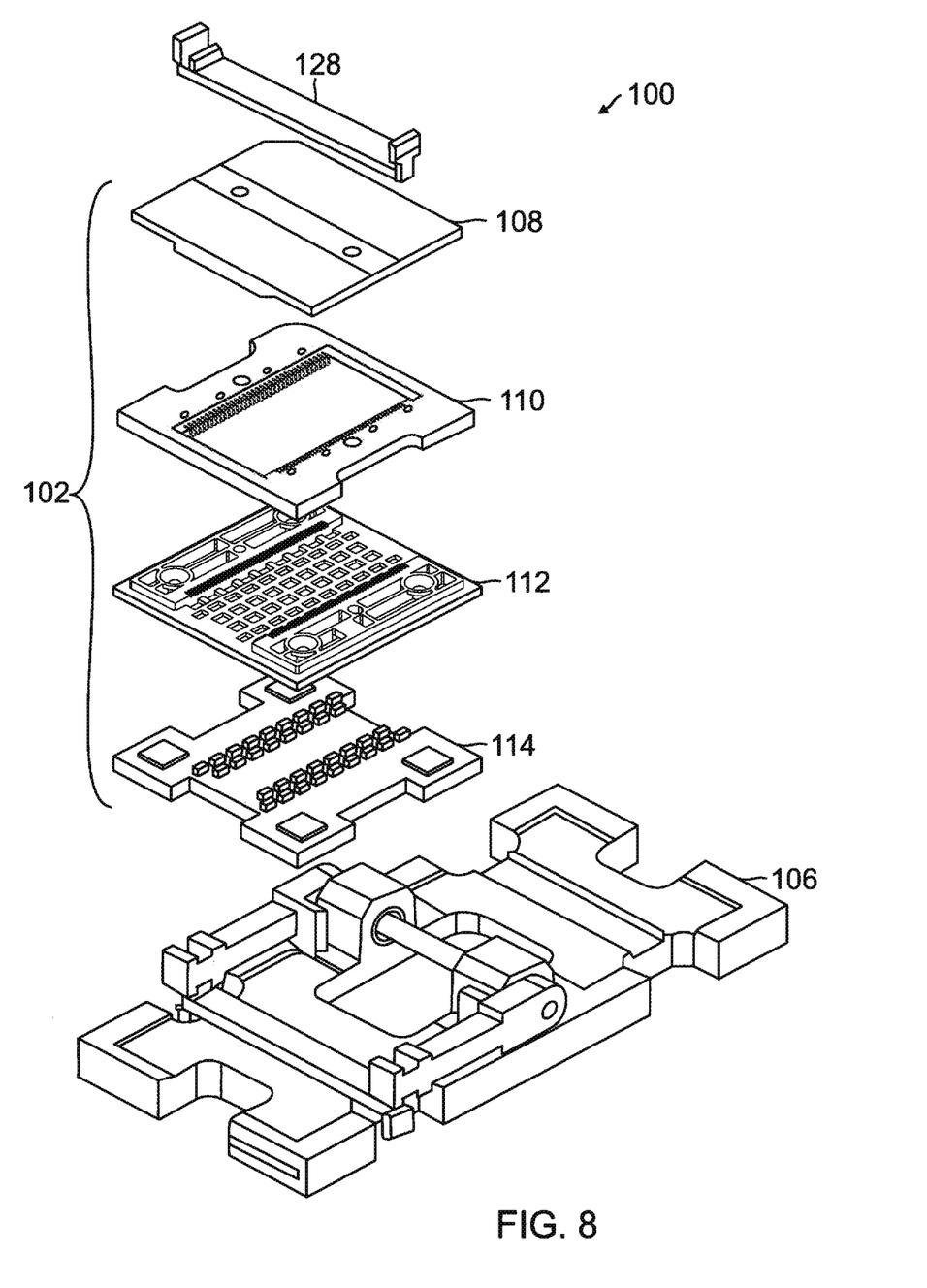
FIG. 8 is an exploded perspective view of the tray assembly and the base support of the row bar repositioning assembly of FIG. 1 in the first position in accordance with one embodiment of the invention.

FIG. 8 is an exploded perspective view of the tray assembly 102 and the base support 106 of the row bar repositioning assembly 100 of FIG. 1 in the first position in accordance with one embodiment of the invention. The base pusher 114 has a number of protrusions that can be used to push the row bars in case they are stuck within the vertical tray 112. In some embodiments, the base pusher 114 is not used and is not part of the tray assembly 102.

In one embodiment, the vertical tray 112 and transfer tray 110 each have a length and width of about 4 inches and a thickness of about 0.2 inches. In one embodiment, the horizontal tray 108 has a length and width of about 4 inches and a thickness of about 0.3 inches. In one embodiment, the base support 106 has a length of about 12 inches a width of about 5 inches and a thickness of about 1 inch. In one embodiment, the vertical tray, horizontal tray, and transfer substrate inserts are made of electrostatic discharge safe plastic. In one embodiment, the base support is made of aluminum and the frame of the transfer tray is made of stainless steel. In other embodiments, other suitable dimensions and materials can be used for each component of the row bar repositioning assembly.

Figure 9:
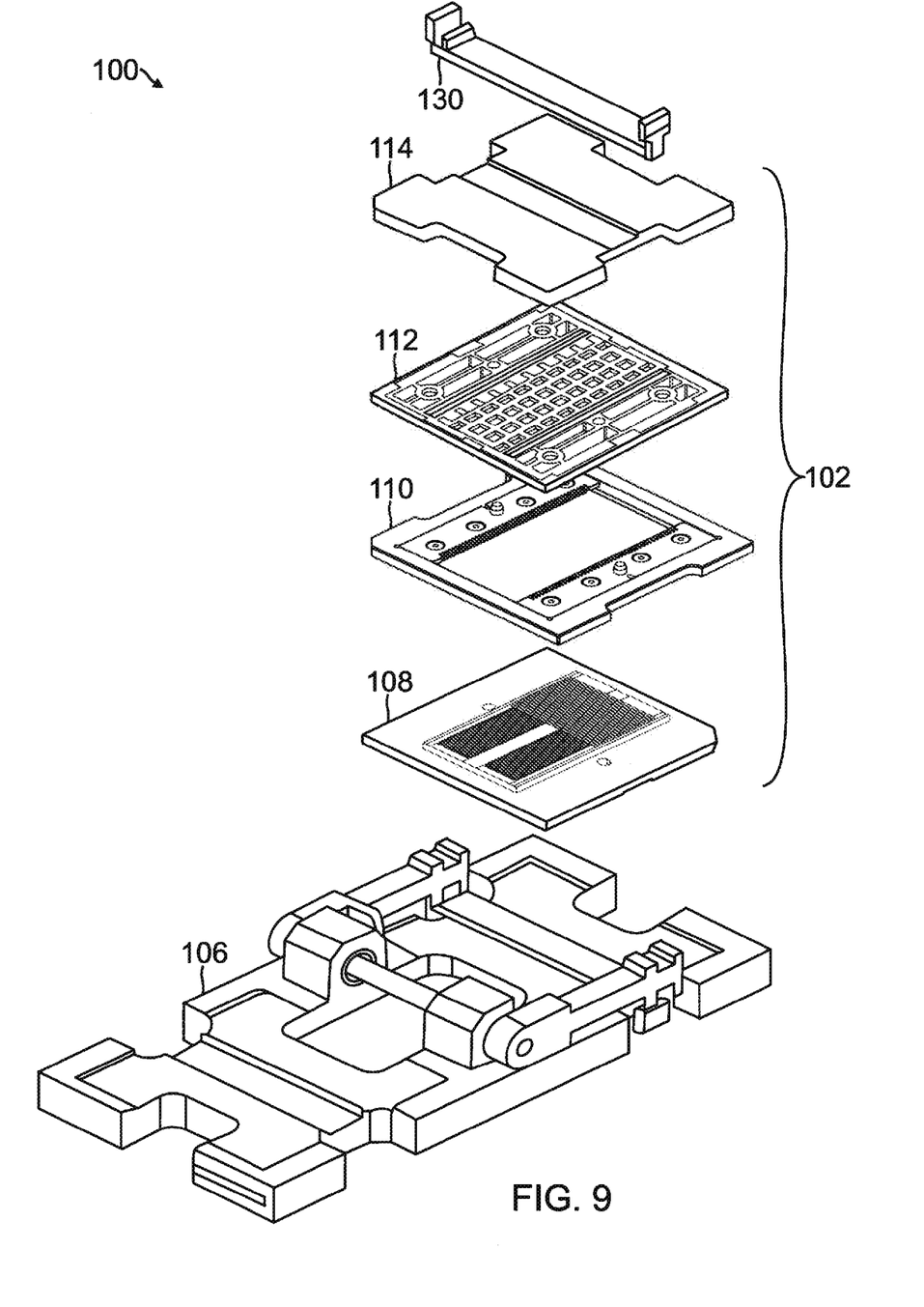
FIG. 9 is an exploded perspective view of the tray assembly and the base support of the row bar repositioning assembly of FIG. 1 in the second position in accordance with one embodiment of the invention.

FIG. 9 is an exploded perspective view of the tray assembly 102 and the base support 106 of the row bar repositioning assembly 100 of FIG. 1 in the second position in accordance with one embodiment of the invention.

Figure 10:
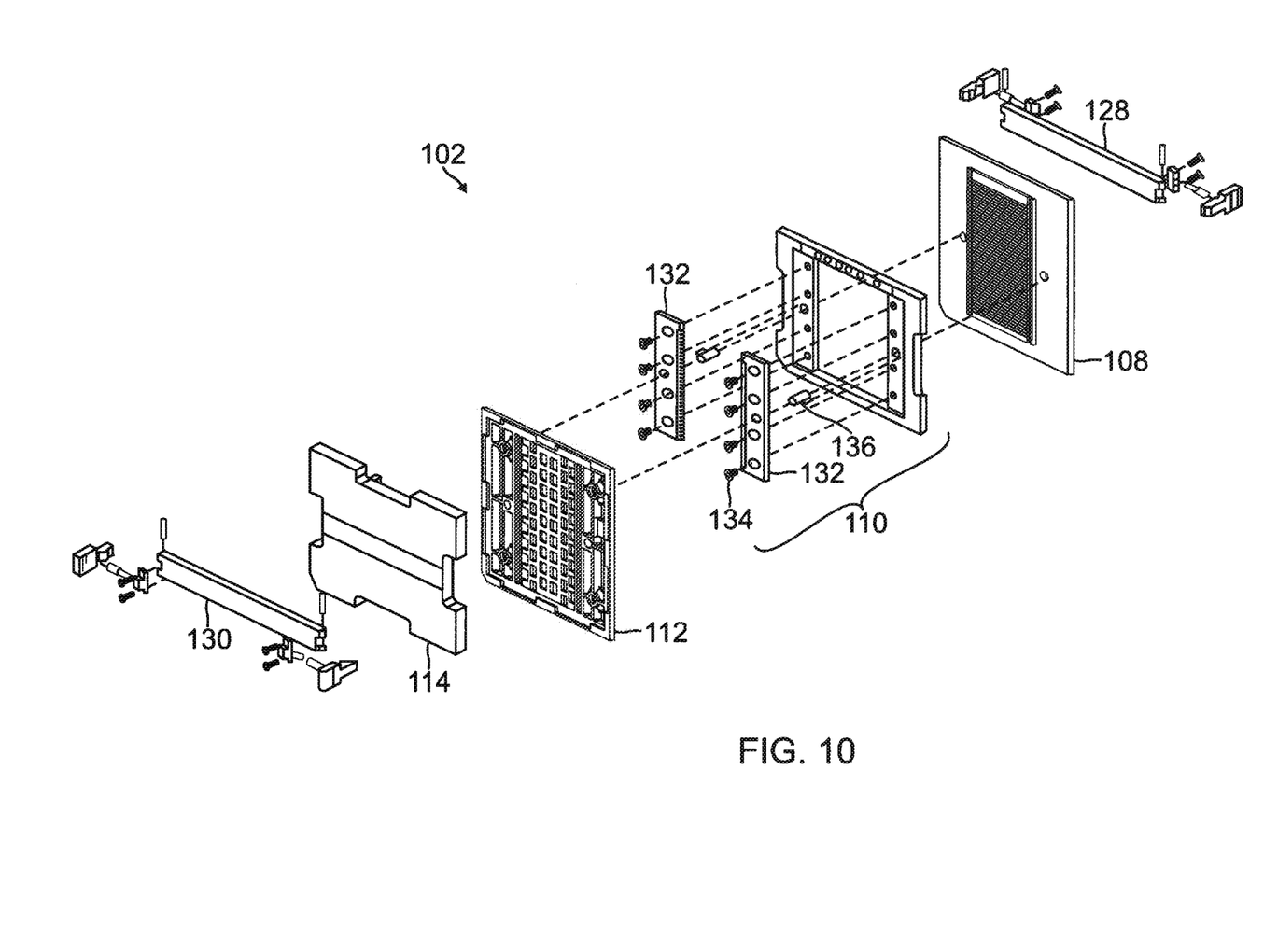
FIG. 10 is an exploded perspective view of the tray assembly of the row bar repositioning assembly of FIG. 1 in accordance with one embodiment of the invention.

FIG. 10 is an exploded perspective view of the tray assembly 102 of the row bar repositioning assembly 100 of FIG. 1 in accordance with one embodiment of the invention.

Figure 11:
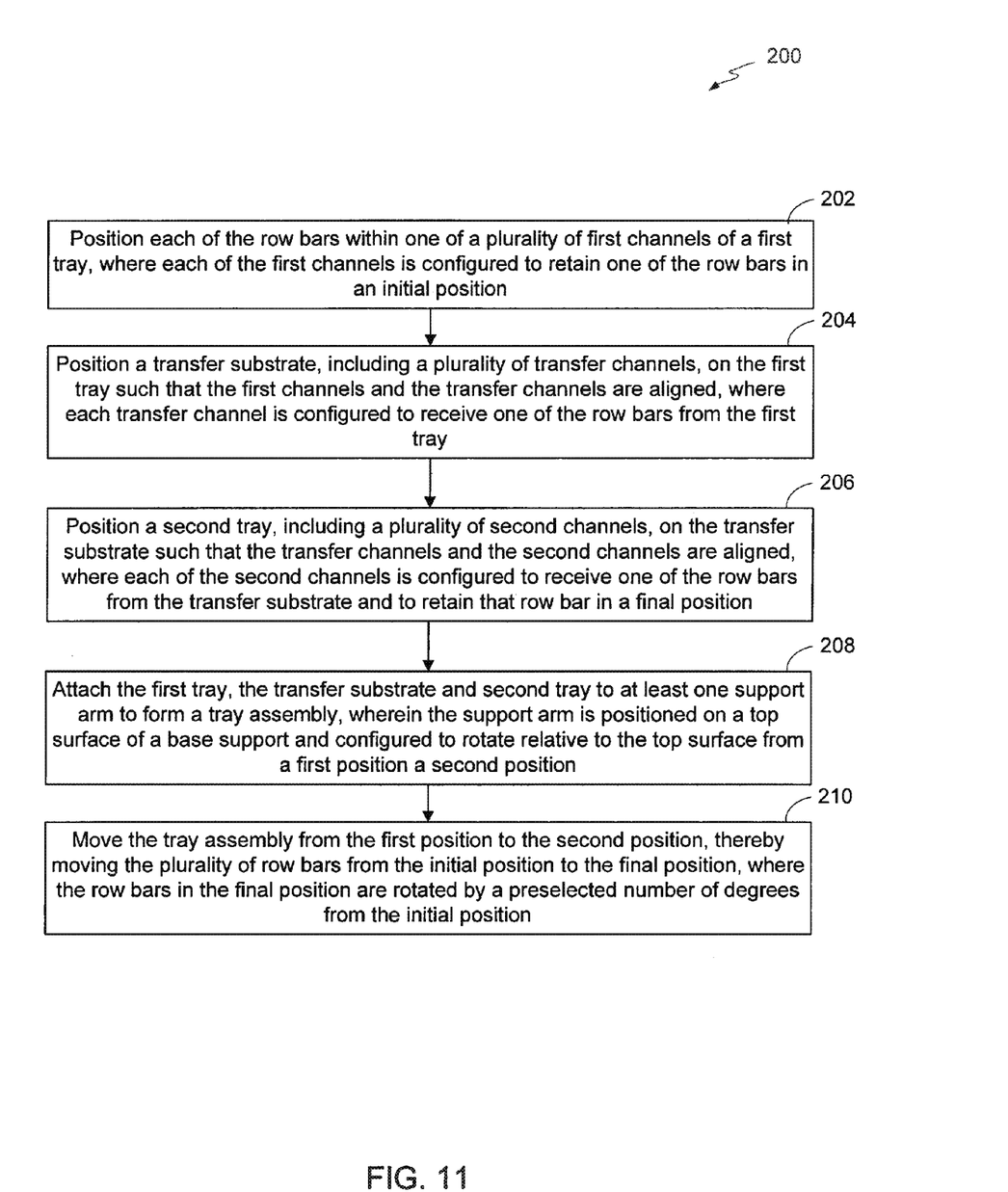
FIG. 11 is a flow chart of a process for operating a row bar repositioning assembly in accordance with one embodiment of the invention.

FIG. 11 is a flow chart of a process 200 for operating a row bar repositioning assembly in accordance with one embodiment of the invention. In a number of embodiments, the process can be performed by an operator during a manufacturing process for producing sliders. In a first block, the process positions (202) each of the row bars within one of the channels of a first tray such as the vertical tray, where each of the channels is configured to retain one of the row bars in an initial position. In one embodiment, the initial position is a vertical position such that a longer of the two dimensions of a cross section of the row bars is perpendicular to a top surface of the vertical tray. The process then positions (204) a transfer substrate, including a plurality of transfer channels, on the first tray such that the first channels and the transfer channels are aligned, where each of the transfer channels is configured to receive one of the row bars from the first tray. In several embodiments, the alignment is facilitated by guide pins extending from the transfer substrate.

The process then positions (206) a second tray, including a plurality of second channels, on the transfer substrate such that the transfer channels and the second channels are aligned, where each of the second channels is configured to receive one of the row bars from the transfer substrate and to retain that row bar in a final position. In several embodiments, the alignment is again facilitated by guide pins extending from the transfer substrate. The process then attaches (208) the first tray, the transfer substrate, and second tray to at least one support arm to form a tray assembly, where the support arm is positioned on a top surface of a base support and configured to rotate relative to the top surface from a first position to a second position.

The process then moves (210) the tray assembly from the first position to the second position, thereby moving the plurality of row bars from the initial position to the final position, where the row bars in the final position are rotated by a preselected number of degrees from the initial position. In several embodiments, the first position represents a zero degree position of the support arms along the top surface of the base support, while the second position represents a 180 degree position of the support arms along the top surface of the base support. In several embodiments, the preselected number of degrees is about 90 degrees. In other embodiments, the preselected number of degrees is greater than or less than 90 degrees.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A system for changing an orientation of a plurality of row bars used for manufacturing magnetic heads, the system comprising:
    a base support comprising:
        a top surface; and
        at least one support arm positioned on the top surface and configured to rotate relative to the top surface from a first position to a second position;
    a tray assembly coupled to the at least one support arm, the tray assembly comprising:
        a first tray comprising a plurality of first channels, each configured to retain one of the row bars in an initial position;
        a transfer substrate comprising a plurality of transfer channels, each configured to receive one of the row bars from the first tray as the support arm moves from the first position to the second position; and
        a second tray comprising a plurality of second channels, each configured to receive one of the row bars from the transfer substrate and to retain the one of the row bars in a final position, wherein the first tray and second tray are configured to sandwich the transfer substrate,
    wherein the row bars in the final position are rotated by a preselected number of degrees from the initial position.

2. The system of claim 1, wherein the at least one support arm is configured to rotate about an axis parallel to the top surface from the first position along the top surface to the second position along the top surface, the second position spaced apart from the first position.

3. The system of claim 1, wherein the at least one support arm comprises a first support arm and a second support arm, each coupled to a shaft configured to rotate within at least one shaft retainer attached to the top surface of the base support.

4. The system of claim 3, wherein the at least one shaft retainer comprises a first shaft retainer and a second shaft retainer each attached to the top surface of the base support and comprising a circular opening configured to receive a portion of the shaft.

5. The system of claim 4, wherein the first shaft retainer and the second shaft retainer are spaced apart by a preselected distance.

6. The system of claim 5, wherein the preselected distance is about equal to a width of the first tray.

7. The system of claim 1, wherein the preselected number of degrees comprises about 90 degrees.

8. The system of claim 1:
wherein each of the row bars comprises an elongated rectangular shape having a rectangular cross section taken along a width, the rectangular cross section comprising a length,
wherein, in the initial position, the length of the cross section of each of the row bars is positioned vertically with respect to the top surface of the base support, and
wherein, in the final position, the length of the cross section of each of the row bars is positioned horizontally with respect to the top surface of the base support.

9. The system of claim 1:
wherein each of the row bars comprises an elongated rectangular shape having a rectangular cross section taken along a width, the rectangular cross section comprising a length,
wherein, in the initial position, the length of the cross section of each of the row bars is positioned horizontally with respect to the top surface of the base support, and
wherein, in the final position, the length of the cross section of each of the row bars is positioned vertically with respect to the top surface of the base support.

10. The system of claim 1, wherein each of the plurality of transfer channels comprises a cross section taken along a width, the cross section having a first end and a second end, wherein a width of the first end is smaller than a width of the second end.

11. The system of claim 10, wherein the first end abuts a first channel of the first tray and the second end abuts a second channel of the second tray.

12. The system of claim 1, wherein the first tray and the second tray comprise a shape that is about square.

13. The system of claim 1:
wherein each of the row bars comprises an elongated rectangular shape having a rectangular cross section taken along a width, the rectangular cross section comprising a length,
wherein each of the first channels of the first tray is shaped to receive a row bar such that the length of the cross section of the row bar is positioned vertically with respect to a top surface of the first tray, and
wherein each of the second channels of the second tray is shaped to receive a row bar such that the length of the cross section of the row bar is positioned horizontally with respect to a top surface of the second tray.

14. A method for changing an orientation of a plurality of row bars used in manufacturing magnetic heads, the method comprising:
positioning each of the plurality of row bars within one of a plurality of channels of a first tray, wherein each of the plurality of channels is configured to retain one of the row bars in an initial position;
positioning a transfer substrate, comprising a plurality of transfer channels, on the first tray such that the first channels and the transfer channels are aligned, wherein each transfer channel of the transfer substrate is configured to receive one of the row bars from the first tray;
positioning a second tray, comprising a plurality of second channels, on the transfer substrate such that the transfer channels and the second channels are aligned, wherein each of the second channels is configured to receive one of the row bars from the transfer substrate and to retain the one of the row bars in a final position;
coupling the first tray, the transfer substrate and second tray to at least one support arm to form an assembly, the at least one support arm positioned on a top surface of a base support and configured to rotate relative to the top surface from a first position a second position; and
moving the assembly from the first position to the second position, thereby moving the plurality of row bars from the initial position to the final position,
wherein the row bars in the final position are rotated by a preselected number of degrees from the initial position.

15. The method of claim 14:
wherein the moving the assembly from the first position to the second position comprises moving the assembly about an axis parallel to the top surface of the base support from the first position along the top surface to the second position along the top surface, the second position spaced apart from the first position, and
wherein the at least one support arm is configured to rotate about the axis parallel to the top surface from the first position to the second position.

16. The method of claim 14, wherein the at least one support arm comprises a first support arm and a second support arm, each coupled to a shaft configured to rotate within at least one shaft retainer attached to the top surface of the base support.

17. The method of claim 16, wherein the at least one shaft retainer comprises a first shaft retainer and a second shaft retainer each attached to the top surface of the base support and comprising a circular opening configured to receive a portion of the shaft.

18. The method of claim 17, wherein the first shaft retainer and the second shaft retainer are spaced apart by a preselected distance.

19. The method of claim 18, wherein the preselected distance is about equal to a width of the first tray.

20. The method of claim 14, wherein the preselected number of degrees comprises about 90 degrees.

21. The method of claim 14:
wherein each of the row bars comprises an elongated rectangular shape having a rectangular cross section taken along a width, the rectangular cross section comprising a length,
wherein, in the initial position, the length of the cross section of each of the row bars is positioned vertically with respect to the top surface of the base support, and
wherein, in the final position, the length of the cross section of each of the row bars is positioned horizontally with respect to the top surface of the base support.

22. The method of claim 14:
   wherein each of the row bars comprises an elongated rectangular shape having a rectangular cross section taken along a width, the rectangular cross section comprising a length,
   wherein, in the initial position, the length of the cross section of each of the row bars is positioned horizontally with respect to the top surface of the base support, and
   wherein, in the final position, the length of the cross section of each of the row bars is positioned vertically with respect to the top surface of the base support.

23. The method of claim 14, wherein each of the plurality of transfer channels comprises a cross section taken along a width, the cross section having a first end and a second end, wherein a width of the first end is smaller than a width of the second end.

24. The method of claim 23, wherein the first end abuts a first channel of the first tray and the second end abuts a second channel of the second tray.

25. The method of claim 14, wherein the first tray and the second tray comprise a shape that is about square.

26. The method of claim 14:
   wherein each of the row bars comprises an elongated rectangular shape having a rectangular cross section taken along a width, the rectangular cross section comprising a length,
   wherein each of the first channels of the first tray are shaped to receive a row bar such that the length of the cross section of the row bar is positioned vertically with respect to a top surface of the first tray, and
   wherein each of the second channels of the second tray are shaped to receive a row bar such that the length of the cross section of the row bar is positioned horizontally with respect to a top surface of the second tray.

27. The system of claim 1, wherein the transfer substrate is attached to the first tray and the second tray.

28. The method of claim 14, wherein the transfer substrate is attached to the first tray and the second tray.

* * * * *